United States Patent Office 3,142,646
Patented July 28, 1964

3,142,646
ANTISEPTIC DETERGENT FORMULATIONS CONTAINING HALOGENATED CARBANILATES
David J. Beaver, Richmond Heights, and Paul J. Stoffel, St. Louis, Mo., assignors to Monsanto Company, a corporation of Delaware
No Drawing. Filed Apr. 11, 1960, Ser. No. 21,115
12 Claims. (Cl. 252—106)

This invention relates to new and useful aromatic esters of 3,4-dihalocarbanilic acid. It is more particularly concerned with the antiseptic and bacteriostatic activity of such esters and with antiseptic and bacteriostatic formulations incorporating such esters.

The new compound of this invention may be represented by the general formula

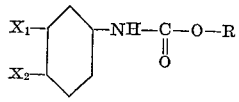

where $X_1$ and $X_2$ are like or unlike halogen atoms, e.g. chlorine or bromine, and where R is a halogenated benzenoid hydrocarbon radical, such as 2-chlorophenyl; 3-chlorophenyl; 3-bromophenyl; 4-chlorophenyl; 4-bromophenyl; 2,4-dichlorophenyl; 3,4-dichlorophenyl; 3,4-dibromophenyl; 2,4,5 - trichlorophenyl; 3,4,5 - trichlorophenyl; 3,4,5-tribromophenyl; 3-chloro-4-methylphenyl; 3,5 - dichloro - 4 - methylphenyl; 3 - chloro - 4 - n - butylphenyl; 3-chloro-4-isohexylphenyl; the various chlorinated biphenylyls such as 3-chloro-4-biphenylyl and the like. While R may contain 1 to 5 halogen atoms, it is preferred that it contain not more than 3 halogen atoms. Of the new compounds of this invention those wherein $X_1$ and $X_2$ are chlorine atoms and wherein R is a phenyl radical containing a chlorine atom in the 3-position and containing at least one unsubstituted ortho position (i.e., either the 2- or 6-positions or both being unsubstituted) are particularly preferred.

In addition to the antiseptic and bacteriostatic properties hereinafter described, the compounds of the above formula also exhibit herbicidal and fungicidal properties.

The following examples indicate the manner in which representative compounds within said formula may be prepared. It should be understood that such examples are merely illustrative, and that other and different compounds within said formula may be readily prepared by those skilled in the art.

EXAMPLE I

In a suitable reaction vessel equipped with a thermometer, agitator and vent containing a calcium chloride drying tube is added 6.9 parts by weight of 3,4-dichlorophenol and 8.0 parts by weight of 3,4-dichlorophenylisocyanate. The mixture is heated at 85–90° C. for 16 hours. The crystalline solid so obtained is taken up with hot ethanol and the solution cooled, filtered and the collected crystalline residue dried. 12.8 parts of 3,4-dichlorophenyl 3,4-dichlorocarbanilate as colorless needles melting at 148.1–149.9° C. is obtained.

Replacing 3,4-dichlorophenol and 3,4-dichlorophenylisocyanate, respectively, in Example I with chemically equivalent weights of 3,4-dibromophenol and 3,4-dibromophenylisocyanate there is obtained 3,4-dibromophenyl 3,4-dibromocarbanilate.

EXAMPLE II

In a suitable reaction vessel equipped with a thermometer, agitator and vent containing a calcium chloride drying tube is added 6.5 parts by weight of o-chlorophenol and 9.4 parts by weight of 3,4-dichlorophenylisocyanate. The mixture is heated at 85–90° C. for 16 hours. The crystalline solid so obtained is taken up with hot ethanol and the solution cooled, filtered and the collected crystalline residue dried. 11.3 parts of 2-chlorophenyl 3,4-dichlorocarbanilate as colorless needles melting at 150.6–151.5° C. is obtained.

EXAMPLE III

In a suitable reaction vessel equipped with a thermometer, agitator and vent containing a calcium chloride drying tube is added 6.5 parts by weight of m-chlorophenol and 9.4 parts by weight of 3,4-dichlorophenylisocyanate. The mixture is heated at 85–90° C. for 16 hours. The crystalline solid so obtained is taken up with hot hexane and the solution cooled, filtered and the collected crystalline residue dried. 11.2 parts of 3-chlorophenyl 3,4-dichlorocarbanilate as colorless granules melting at 112.0–112.6° C. is obtained.

Replacing m-chlorophenol in Example III with a chemically equivalent weight of m-bromophenol there is obtained 3-bromophenyl 3,4-dichlorocarbanilate.

Replacing m-chlorophenol and 3,4-dichlorophenylisocyanate in Example III, respectively, with chemically equivalent weights of m-bromophenol and 3,4-dibromophenylisocyanate there is obtained 3-bromophenyl 3,4-dibromocarbanilate.

EXAMPLE IV

In a suitable reaction vessel equipped with a thermometer, agitator and vent containing a calcium chloride drying tube is added 6.5 parts by weight of p-chlorophenol and 9.4 parts by weight of 3,4-dichlorophenylisocyanate. The mixture is heated at 85–90° C. for 16 hours. The crystalline solid so obtained is taken up with hot ethanol and the solution cooled, filtered and the collected crystalline residue dried. 14.1 parts of 4-chlorophenyl 3,4-dichlorocarbanilate as glistening plates melting at 149.5–150.7° C. is obtained.

EXAMPLE V

In a suitable reaction vessel equipped with a thermometer, agitator and vent containing a calcium chloride drying tube is added 3.8 parts by weight of 4-chloro-m-cresol and 4.7 parts by weight of 3,4-dichlorophenylisocyanate. The mixture is heated at 85–90° C. for 16 hours. The crystalline solid so obtained is taken up with hot ethanol and the solution cooled, filtered and the collected crystalline residue dried. 5.9 parts of 3-methyl-4-chlorophenyl 3,4-dichlorocarbanilate as fine colorless needles melting at 147.2–148° C. is obtained.

EXAMPLE VI

In a suitable reaction vessel equipped with a thermometer, agitator and vent containing a calcium chloride drying tube is added 4.0 parts by weight of 4-chloro-3,5-xylenol and 4.7 parts by weight of 3,4-dichlorophenylisocyanate. The mixture is heated at 85–90° C. for 16 hours. The crystalline solid so obtained is taken up with hot ethanol and the solution cooled, filtered and the collected crystalline residue dried. 7.0 parts of 3,5-dimethyl-4-chlorophenyl 3,4-dichlorocarbanilate as colorless needles melting at 173.7–174.2° C. is obtained.

EXAMPLE VII

In a suitable reaction vessel equipped with a thermometer, agitator and vent containing a calcium chloride drying tube is added 4.9 parts by weight of 2,4,5-trichlorophenol and 4.7 parts by weight of 3,4-dichlorophenylisocyanate. The mixture is heated at 85–90° C. for 16 hours. The crystalline solid so obtained is slurried with hot ethanol, filtered and the collected crystalline residue dried. 6.8 parts of 2,4,5-trichlorophenyl 3,4-dichlorocarbanilate as white powder melting at 166.4–167.2° C. is obtained.

Replacing 2,4,5-trichlorophenol in Example VII with a chemically equivalent weight of 3,4,5-trichlorophenol there is obtained 3,4,5-trichlorophenyl 3,4-dichlorocarbanilate.

In the preparation of the new compounds, while solvents are in general not necessary in that the reactants usually provide a fluid medium, such inert solvents as hexane, toluene, chlorobenzene, and the like may be employed. The reaction temperatures employed in preparing the new compounds will depend upon the particular reactants and in general will be in the range of room temperature to the reflux temperature of the system.

The compounds of the general formula

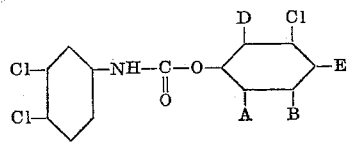

where A and D are atoms selected from the group consisting of hydrogen and chlorine, provided that at least one of A and D must be hydrogen, and where B and E are like or unlike atoms selected from the group consisting of hydrogen and chlorine have been found to exhibit outstanding bacteriostatic properties when incorporated in formulations including a cleansing agent. Exemplary compounds within said formula include 3-chlorophenyl 3,4-dichlorocarbanilate, 3,4-dichlorophenyl 3,4-dichlorocarbanilate, 2,4,5-trichlorophenyl 3,4-dichlorocarbanilate and 3,4,5-trichlorophenyl 3,4-dichlorocarbanilate. By cleansing agents is meant soaps or other detergents, mixtures thereof and also certain crude oil derivatives such as white mineral oil and petrolatum. The term soap is employed in its popular meaning and refers to cleansing agents usually made by the action of an alkali on fat or fatty acids, e.g., the sodium or potassium salts of either saturated or unsaturated fatty acids. By way of example each of the first three exemplary compounds noted above was separately incorporated in a neutral high grade white soap (a mixture of 80 percent sodium soap and 20 percent potassium soap produced from a 70 percent tallow and 30 percent oil glyceride blend in accordance with U.S. Patent 2,295,594), in a weight ratio of one part to 50 parts by weight soap. Aliquots of each were added to a Sabourard's dextrose agar medium so as to give concentrations of the compounds in the agar as set forth in Table I below. The agar in each case was then poured into a petri dish, allowed to harden, and then inoculated with a standard culture of the bacterium *Micrococcus pyogenes* var. *aureus* of standard resistance. The incubation in each instance was made simultaneously at 37° C. for 48 hours. The extent of growth is noted below:

Table I

| Concentration, p.p.m. | 10 | 1 |
| --- | --- | --- |
| 3-chlorophenyl 3,4-dichlorocarbanilate | None | None. |
| 3,4-dichlorophenyl 3,4-dichlorocarbanilate | ---do--- | Do. |
| 2,4,5-trichlorophenyl 3,4-dichlorocarbanilate | ---do--- | Moderate. |

It is to be understood that the use of the chlorophenyl 3,4-dichlorocarbanilates with soap as set forth in the above table is merely illustrative. These compounds may also be used with other detergents including the so-called anionic and non-ionic detergents and have proven equally effective therein. Other alkali metal soaps of higher fatty acids of animal or vegetable origin may be used such as stearic, lauric, palmitic, oleic, linoleic, ricinoleic, and the like, including mixtures thereof obtained from tallow, lard, coconut oil, palm oil, caster oil, olive oil, hydrogenated fish and cottonseed oils and the like.

The detergents contemplated by this invention include the well known organic anionic type such as the surface active alkali metal sulfonates and sulfates. Representative of these are the long chain alkyl aryl sulfonates, i.e. those wherein the alkyl radical is straight or branched in structure and contains from 8 to 22 carbon atoms, but preferably 10 to 16 carbon atoms, examples of such being octyl, decyl, dodecyl, keryl, pentadecyl, hexadecyl, octadecyl, mixed long chain alkyls derived from long chain fatty materials such as the lauryl radical, cracked paraffin wax olefins, polymers of lower monoolefins such as propylene tetramer and the like, and wherein the aryl radical is derived from benzene, toluene, xylene, phenol, the cresols, naphthalene, and the like. Specific examples of such comprise sodium decyl benzene sulfonate, sodium dodecyl benzene sulfonate, sodium lauryl benzene sulfonate and sodium hexadecyl benzene sulfonate.

Other sulfonate surface-active agents are also contemplated, e.g. the long chain alkyl sulfonates such as sodium hexadecane sulfonate and sodium octadecane sulfonate.

The well known sulfate detergents having 12 to 26 carbon atoms and particularly those having an alkyl radical of about 8 to 22 carbon atoms may be employed as anionic detergent bases in accordance with this invention. Such detergents include the sulfuric acid esters of polyhydric alcohols incompletely esterified with fatty acids, e.g. sodium coconut oil monoglyceride mono-sulfate, sodium tallow diglyceride monosulfate, the pure and mixed higher alkyl sulfates such as sodium lauryl sulfate and sodium cetyl sulfate. Further descriptive information regarding these compounds may be found in U.S. Patent 2,264,737.

Additional anionic surface active sulfonates and sulfates contemplated by this invention are the sulfated and sulfonated alkyl acid amides such as Igepon T

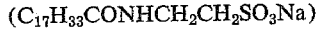

the sulfated and sulfonated esters such as Igepon AP ($RCOOCH_2SO_3Na$ where R is an alkyl radical containing from 12 to 18 carbon atoms), sodium salt of the bisulfate of a dialkyl dicarboxylate, sodium salt of the sulfonic acid derivative of a dialkyl dicarboxylate, sodium salt of sulfosuccinic acids such as

and the like.

In addition to the organic anionic detergents, the non-ionic surface-active agents containing the desired chlorophenyl 3,4-dichlorocarbanilate derivatives provide effective bacteriostatic cleansing formulations. The non-ionic surface active agents contemplated are viscous liquid to wax-like water-soluble surface-active substances containing a polyglycol ether group of the structure

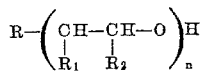

wherein $R_1$ and $R_2$ are hydrogen or short chain alkyl, where $n$ is an integer greater than 3, and where R is a residue of a compound of a monomeric organic compound having an active hydrogen, e.g. alcohols, phenols, amides, primary amines, secondary amines, carboxylic acids, etc. These non-ionic detergents are well known (note U.S. 1,970,578 and U.S. 2,213,477) and may be typified by the polyalkylene oxide derivatives (i.e. polyethylene oxide, polypropylene oxide, polybutylene oxide) of water-insoluble higher fatty acids, such as lauric, oleic, palmitic, and stearic acid and the like or mixtures thereof, such as the mixtures of fatty acids, obtained from animal and vegetable fats and oils or by oxidation of petroleum fractions such as paraffin wax. They may also be exemplified by the polyalkylene oxide derivatives of such water-insoluble organic hydroxy compounds as higher aliphatic alcohols (i.e. the alcohols corresponding to the fatty acids specified above or mixtures thereof), oil or phenols, particularly alkyl phenols containing at least six alkyl carbon atoms such as isooctyl-, di-tertiary butyl-, tri-isopropyl-, nonyl-, dodecyl-, octadecyl- phenols or naphthols, or higher alkyl alcohols, such as benzyl alcohol, cinnamyl alcohol. They may also be exemplified by the polyalkylene oxide derivatives of such amines as stearyl, lauryl, dicyclohexyl, dibutyl amine and the like. A particularly useful non-ionic detergent is that obtained by condensing one mol of tall oil with 5 to 15 mols of ethylene oxide (see U.S. 2,550,691).

The chlorophenyl 3,4-dichlorocarbanilates are also useful in preparing cleansing formulations with a combination of surface active detergents plus other ingredients as illustrated by the following:

| | Parts by weight |
|---|---|
| Triethanol amine lauryl sulfate | 60 |
| Methyl cellulose | 2 |
| Propylene glycol | 4 |
| Potassium stearate | 6 |
| Water | 130 |
| 3-chlorophenyl 3,4-dichlorocarbanilate | 1 |

Moreover, the compounds of this invention may be incorporated in a detergent or mixtures of detergents to form useful antiseptic formulations as illustrated by the following:

| | Parts by weight |
|---|---|
| Tall oil-ethylene oxide condensation product (1 mol tall oil-11 mols ethylene oxide) | 20 |
| Sodium dodecyl benzene sulfonate | 80 |
| Carboxy methyl cellulose, sodium | 4 |
| Sodium tripolyphosphate | 80 |
| Sodium sulfate | 200 |
| 3,4-dichlorophenyl 3,4-dichlorocarbanilate | 1 |

The chlorophenyl 3,4-dichlorocarbanilates of this invention may be employed in cosmetic formulations ordinarily used to beautify, cleanse or protect the skin in an amount sufficient to kill or to inhibit the growth of bacteria, specifically *Micrococcus pyogenes* var. *aureus*, normally present on the skin. Relatively small amounts of the chlorophenyl 3,4-dichlorocarbanilates of this invention in cosmetics, particularly those having as a base an anionic or non-ionic organic detergent composition or a combination thereof, have been found to yield effective antiseptic formulations. With respect to cosmetics having an anionic or non-ionic detergent base amounts as low as 0.5% to 1% by weight based upon the total weight of the organic detergent may be employed. It is preferred in detergent cleansing formulations having an anionic detergent base or non-ionic detergent base to employ these chlorophenyl 3,4-dichlorocarbanilates in amounts in the order of 1% to 3% by weight based on the total weight of detergent. While larger amounts with respect to the detergent base may be employed, the upper limit will be determined by practical considerations as well as by the particular cosmetic formulation involved, i.e. whether said formulation is to be used for cleansing purposes in the sense of a toilet soap or as a shaving cream or as a shampoo, etc. In cleansing formulations in the sense of a toilet soap containing an anionic organic detergent base (e.g. an alkali metal fatty acid detergent soap alone or in admixture with another anionic organic detergent such as the aforedescribed sodium alkyl aryl sulfonate detergents) or non-ionic detergent base, the amount of chlorophenyl 3,4-dichlorocarbanilates of this invention ordinarily will not exceed 10% by weight of the detergent base. However, in shampoos, shaving creams and the like, employing an anionic detergent base or non-ionic detergent base the chlorophenyl 3,4-dichlorocarbanilates of this invention may be present to the extent of 50% by weight based on the total detergent base content. Various colored pigments and dyes, anti-oxidants, perfumes, water-softeners, salts such as silicates, chlorides, carbonates, phosphates and sulfates of alkali metals and the like builders, sodium carboxy methyl cellulose, the low molecular weight alcohols such as methanol, ethanol, isopropanol, ethylene glycol, and the like, may be included where desirable.

The chlorophenyl 3,4-dichlorocarbanilates of this invention may also be incorporated in antiseptic creams and ointments. Such formulations generally employ a crude oil derivative as the cream or ointment base, more specifically, white mineral oil or petrolatum. The carbanilates are incorporated into such bases by gentle warming and subsequent stirring to insure homogeneity. These bases are semisolid in consistency and have a melting point high enough to prevent liquefaction below at least 100° C. A typical formulation with such a semisolid base is as follows:

| | Percent |
|---|---|
| U.S.P. petrolatum | 19 |
| White mineral oil (65–75 viscosity) | 63 |
| White beeswax | 6 |
| White paraffin | 11.5 |
| 3-chlorophenyl 3,4-dichlorocarbanilate | 0.5 |

The carbanilate is preferably used in amounts which will not exceed 10% by weight of the semisolid base.

While this invention has been described with respect to certain embodiments, it is not so limited and it is to be understood that variations and modifications thereof obvious to those skilled in the art may be made without departing from the spirit or scope of this invention.

This application is a continuation-in-part of copending application Serial No. 716,287, filed February 20, 1958, and now abandoned, which is in turn a continuation-in-part of application Serial No. 510,548, filed May 23, 1955, and now Patent No. 2,858,328.

The embodiments of the invention in which an exclusive property or privilege is claimed are defined as follows:

1. An antiseptic cleansing composition comprising a synthetic organic detergent selected from the class consisting of anionic and non-ionic detergents and mixtures thereof, and from 0.5 to 50% by weight, based on said synthetic organic detergent, of a compound of the structure,

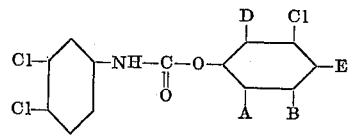

where A, B, D and E are atoms selected from the group consisting of hydrogen and chlorine, provided that at least one of A and D must be hydrogen.

2. A method of controlling the growth of bacteria on a surface which comprises cleansing said surface with the cleansing composition of claim 1.

3. An antiseptic cleansing composition comprising a synthetic organic detergent selected from the class consisting of anionic and non-ionic detergents and mixtures thereof, and from 0.5 to 10% by weight, based on said synthetic organic detergent, of a compound of the structure,

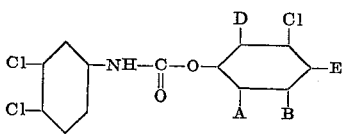

where A, B, D and E are atoms selected from the group consisting of hydrogen and chlorine, provided that at least one of A and D must be hydrogen.

4. A method of controlling the growth of bacteria on a surface which comprises cleansing said surface with the cleansing composition of claim 3.

5. An antiseptic cleansing composition comprising a synthetic organic anionic detergent and from 0.5 to 10% by weight, based on said detergent, of a compound of the structure,

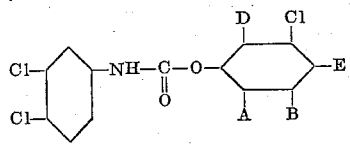

where A, B, D and E are atoms selected from the group consisting of hydrogen and chlorine, provided that at least one of A and D must be hydrogen.

6. A method of controlling the growth of bacteria on a surface which comprises cleansing said surface with the cleansing composition of claim 5.

7. An antiseptic cleansing composition comprising a synthetic organic non-ionic detergent and from 0.5 to 10% by weight, based on said detergent, of a compound of the structure,

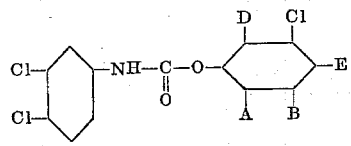

where A, B, D and E are atoms selected from the group consisting of hydrogen and chlorine, provided that at least one of A and D must be hydrogen.

8. A method of controlling the growth of bacteria on a surface which comprises cleansing said surface with the cleansing composition of claim 7.

9. An antiseptic cleansing composition comprising a synthetic organic detergent selected from the class consisting of anionic and non-ionic detergents and mixtures thereof, and from 0.5 to 10% by weight, based on said detergent, of 3-chlorophenyl 3,4-dichlorocarbanilate.

10. An antiseptic cleansing composition comprising a synthetic organic detergent selected from the class consisting of anionic and non-ionic detergents and mixtures thereof, and from 0.5 to 10% by weight, based on said detergent, of 3,4-dichlorophenyl 3,4-dichlorocarbanilate.

11. An antiseptic cleansing composition comprising a synthetic organic detergent selected from the class consisting of anionic and non-ionic detergents and mixtures thereof, and from 0.5 to 10% by weight, based on said detergent, of 2,4,5-trichlorophenyl 3,4-dichlorocarbanilate.

12. An antiseptic cleansing composition comprising a synthetic organic detergent selected from the class consisting of anionic and non-ionic detergents and mixtures thereof, and from 0.5 to 10% by weight, based on said detergent, of 3,4,5-trichlorophenyl 3,4-dichlorocarbanilate.

References Cited in the file of this patent

UNITED STATES PATENTS

| | | |
|---|---|---|
| 1,870,107 | Fuller | Aug. 2, 1932 |
| 2,634,289 | Butler | Apr. 7, 1953 |
| 2,678,302 | Beaver et al. | May 11, 1954 |
| 2,692,862 | Lipsitz | Oct. 26, 1954 |
| 2,734,911 | Strain | Feb. 14, 1956 |
| 2,742,434 | Kopp | Apr. 17, 1956 |
| 2,843,522 | Mahon | July 15, 1958 |
| 2,931,777 | Shelanski | Apr. 5, 1960 |
| 2,951,786 | Pullen et al. | Sept. 6, 1960 |

OTHER REFERENCES

Thompson: "Botanical Gazette," 107, 490–2, 499, 503 and 504 (1946).

Shaw et al.: "Chemical Abstracts," 47, 11638 (1953).